J. S. WOOD.
Gas Machine.

No. 101,558.

Patented April 5, 1870.

Witnesses:
Wm P. Smith.
Edw J Brown.

Inventor:
Joseph S. Wood,

United States Patent Office.

JOSEPH S. WOOD, OF PHILADELPHIA, PENNSYLVANIA, ASSIGNOR TO HIMSELF AND JOHN J. CARBERRY, OF SAME PLACE.

Letters Patent No. 101,558, dated April 5, 1870.

---

IMPROVEMENT IN GENERATING HYDROGEN AND HYDROCARBON GAS

The Schedule referred to in these Letters Patent and making part of the same

---

I, JOSEPH S. WOOD, of the city and county of Philadelphia and State of Pennsylvania, have invented certain Improvements in "Generating Hydrogen and Hydrocarbon Gas," of which the following is a specification.

The nature of my invention consists in the construction of an apparatus with an upper and lower chamber, so connected by a pipe and stop-cock that the dilute acid, when under pressure, passes from the lower chamber into the upper one, where it can be retained by means of the stop-cock, whilst the refuse is being taken from the bottom chamber.

Also, in the manner of passing the basket for iron filings through both the upper and lower chambers.

Also, in the construction and arrangement of the device for carbureting or naphthalizing the hydrogen.

To enable others skilled in the art to make and use my invention, I will proceed to describe its construction and operation, reference being had to the accompanying drawings.

Figure 1:
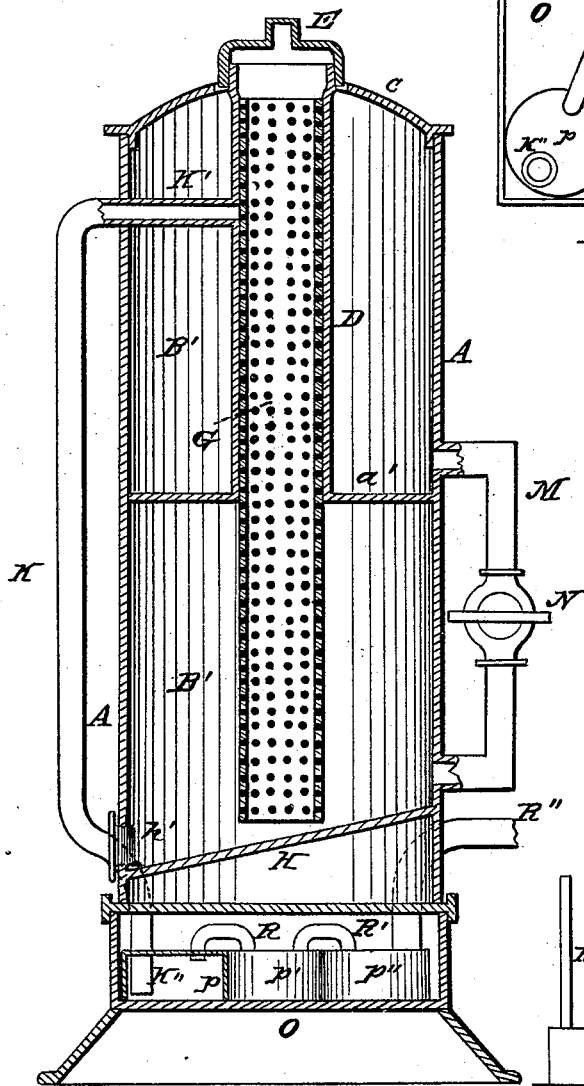
Figure 2:
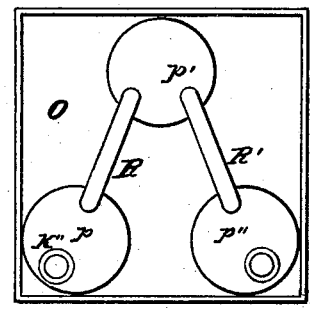
Figure 3:
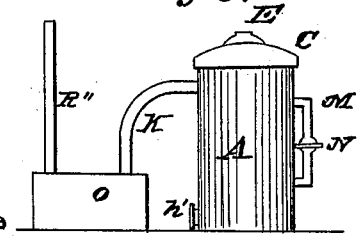

Figure 1 is a vertical section.
Figure 2 is a plan of the carbureter.
Figure 3 is a general view of the hydrogen-gas machine and carbureter, arranged as two distinct machines.

A is the cylindrical vessel, having a partition, $a'$, in the center, so as to divide it into an upper and lower chamber or tank, B B'.

The tank B is open to the air at the top, but covered with a lid, C, removable, so that the tank B can be filled with water and acid, and its temperature and density easily tested.

From the bottom of the tank B passes the pipe M, having a stop-cock, N, upon it, and connecting with the lower tank B' at a lower level than the bottom of the basket G.

The division-plate $a'$ has a central hole, to which is brazed the pipe D, passing out through the lid C, and closed with a tight cap, E, screwed on.

Within this tube is inserted the basket G, for iron filings.

It passes downward to near the bottom of the tank B', which has a bottom, H, inclined, as shown, toward the outlet-valve $h'$, by which the sediment is extracted.

A tube, K', at the top of the chamber B, connects the guide-tube D with the exterior of the cylinder A.

Beneath the vessel A is arranged the carbureting-machine O, containing within it several small boxes $p$ $p'$ $p''$, containing gasoline or hydrocarbon-liquid.

The hydrogen gas, air, or coal gas to be carbureted passes into one of these boxes $p$ by the pipe K'', and escapes at the bottom of the box beneath the level of gasoline. It then passes from the upper part of the said box, by pipe R, into the box $p'$, where it receives an additional amount of carbon, and so on, in a similar manner, to box $p''$, from which it escapes by pipe R'' to the gas-burners.

The operation of the machine is in this manner:

The cap E is unscrewed and basket G filled with iron turnings, and the cap E screwed on tight again. The upper tank B is now filled with dilute acid, which runs down the connecting-pipe M and fills the lower chamber B'. The contact of the liquid and iron generates the hydrogen gas, which passes up the basket G, and out at pipe K', and into the carbureting-machine O, as previously described, from which it passes out at R'' to the burners in the state of carbureted-hydrogen gas.

When the gas-lights are turned out, and the pressure of the gas becomes too strong, the liquid is forced up the pipe M into the upper chamber B, out of contact with the basket G, and no more gas is generated. The stop-cock N may now be closed, and the liquid retained in the upper tank B, while the sulphate and residuum is drawn off at the outlet $h'$.

By this construction I avoid the drawing off of the liquid on every removal of the deposit.

I use the carbureting-machine O as a base or stand for the cylinder A. It is not, however, essential they should be so arranged. They may be arranged, as shown in fig. 3, at some distance apart, the carbureting-machine in the yard and the hydrogen-machine in the cellar, as may suit convenience or safety.

By this construction of machine, when the cock N is closed the liquid is retained in the upper chamber until properly mixed. The cock is then full opened, and the liquid falls into the lower chamber. If too much gas is generated, the liquid passes back into the upper chamber by the pressure of gas upon it. In this manner it passes from chamber to chamber according to the number of lights required.

What I claim as my invention, and desire to secure by Letters Patent, is—

1. The pipe M and stop-cock N, arranged so as to connect the upper reservoir B with the lower generating gas-chamber B', that the dilute acid passes from the chamber B to the chamber B', and back again from the lower to the upper according to the pressure of the gas, substantially as herein described.

2. The arrangement of the basket G passing through the guide-tube D within the chamber B, into the lower chamber B', for the purpose herein deteribed.

3. The arrangement of the guide-tube D, outlet-pipe for gas K', and basket G, in combination with the chambers B B', substantially as herein described.

JOSEPH S. WOOD.

Witnesses:
WM. P. SMITH,
EDWD. BROWN.